Figure 1:
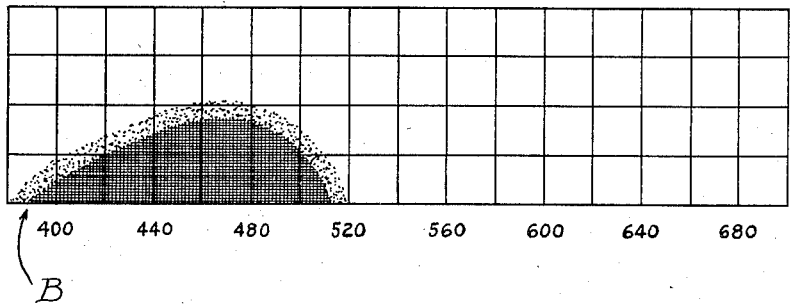

Feb. 13, 1940.  V. B. SEASE  2,189,837
TRIPACK
Filed Jan. 15, 1937  2 Sheets-Sheet 1

INVENTOR.
V. B. Sease.
BY E. H. Gates
ATTORNEY

Feb. 13, 1940. V. B. SEASE 2,189,837
TRIPACK
Filed Jan. 15, 1937 2 Sheets-Sheet 2

Patented Feb. 13, 1940

2,189,837

UNITED STATES PATENT OFFICE 2,189,837

TRIPACK

Virgil Bernard Sease, Hillcrest, Highland Park, N. J., assignor to Du Pont Film Manufacturing Corporation, New York, N. Y., a corporation of Delaware Application January 15, 1937, Serial No. 120,807

5 Claims. (Cl. 95—2)

This invention relates to color photography, and particularly to an improved multipack unit.

A principal object of this invention is to provide a multipack that will afford improved definition of image, and a further object is to provide such a unit that will greatly simplify the technique required to process the film to color. Further objects will more plainly appear from the detailed description that is presented in exemplification and not in limitation herein.

Many forms of bi-pack, tri-pack and multipack films for color photography are suggested by prior art. In general, these films depend on the screening action of dye layers to filter out those portions of the spectrum not desired to be recorded on a particular emulsion of the pack. Thus, incorporated in or immediately behind a blue sensitive layer is a yellow or minus-blue dye so as to prevent the blue rays from passing on through to the orthochromatic, and panchromatic emulsions. Likewise a red dye is positioned behind the orthochromatic and before the panchromatic emulsion so as to allow only orange and red rays to expose the panchromatic layer. It has been proposed to incorporate these filter dyes in the respective emulsion layers, namely, the yellow in the blue and the red in or on the orthochromatic emulsions, in order to decrease the over-all separation distance between the front and rear emulsions and thus afford sharper images. In actual practice, however, the normal contrast, speed and gradation characteristics are harmfully affected by the incorporation of these dyes in the emulsion. In the case of the red filter dye in particular, it is extremely difficult to find a dye which, while having the proper spectral characteristics, can also be removed without troublesome and prolonged processing.

It has also been proposed to subdue or damp the inherent blue sensitivity of sensitized emulsions by increasing the ratio of silver halide to binding agent (gelatin). These and numerous other proposals are to be found which attempted to increase the sharpness of the images on the rear emulsion layers of multipack units. It has long been recognized that the red, or panchromatic, layer is the blue-printing negative and the blue image is the "drawing" or detail part-image of subtractive photography, and that consequently the image on the panchromatic layer should be as sharp as possible.

The present invention provides a multipack unit wherein only one filter dye is used, thus affording a closer packing of the individual films.

It is also possible, by my improved method of manufacture, to move the panchromatic layer up to the middle position of a tri-pack, or the middle emulsion layer of a multi-layer film or as the outer layer of a support carrying two, differently color-sensitive layers.

These results are obtained by sensitizing the emulsion, which is hereinafter called the panchromatic layer, by certain dyes wherein the emulsion is substantially color-blind in the green region but sensitive in the blue and orange-red regions.

The drawings represent diagrammatically in—

Figure 2:
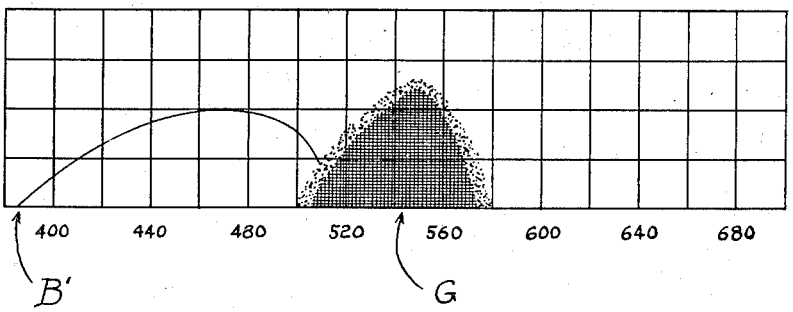
Figure 3:
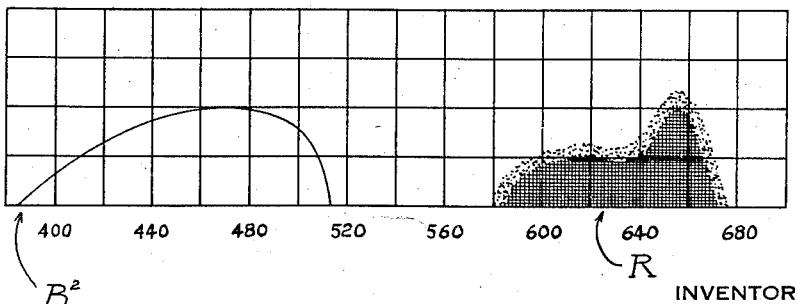
Figure 4:
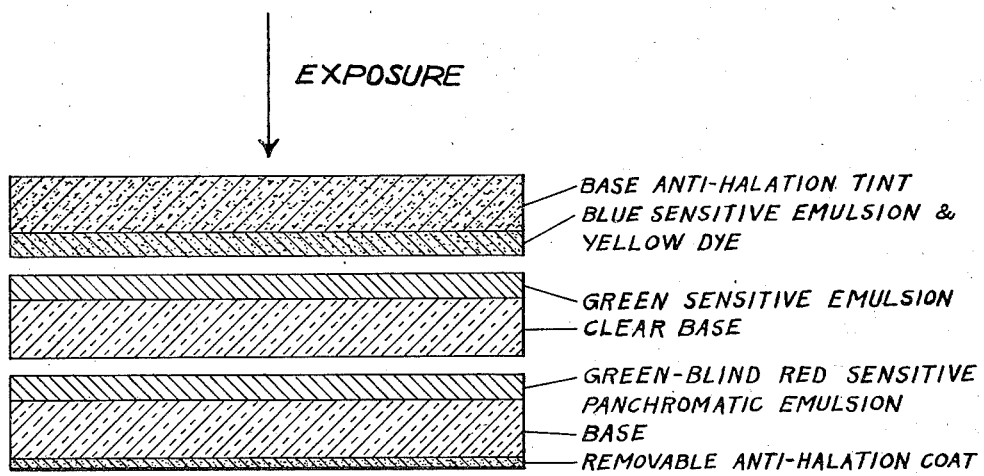

Fig. 1 a spectrogram that defines the characteristics of the front multipack element in millimicrons with respect to relative sensitivity: this is the blue sensitive element;

Fig. 2, a spectrogram that defines in a like manner the characteristics of the intermediate multipack element: this is the green sensitive element;

Fig. 3, a spectrogram that defines in a like manner the characteristics of the rear multipack element: this is the red sensitive element; and Fig. 4 is a sectional view of a practical tri-pack film construction.

The front element of this preferred form of my improved multipack (illustrated in Fig. 4), which is positioned in the camera facing the objective, comprises a film base preferably of cellulose acetate, bearing on its rear face or side a blue sensitive emulsion layer having a sensitivity of 390 to 520 mu. This emulsion is of the well-known unsensitized type, containing no sensitizing dyes. Incorporated in this emulsion is a removable yellow filter dye, such as Tartrazine, Naphthol Yellow or Luxol Yellow which disappears during processing. The film base preferably bears a neutral gray anti-halation tint that is non-removable and may be obtained from such dyes as a combination of Resin Black and Wool Fast Blue, Nigrosine or Induline, applied so as to afford a total light transmission of approximately 65%.

The intermediate element comprises a clear cellulose acetate film base bearing on its front side a green-sensitive emulsion layer having a sensitivity range of 390 to 580 mu., and preferably on its rear side a clear gel or non-curling layer. The emulsion of this film is of the well-known orthochromatic type and may be sensitized, for example, with 1-1' diethyl thiopseudocyanine iodide or 1-1' diethyl-6-methyl pseudocyanine iodide. Any suitable transparent support may be substituted for the cellulose acetate film base above mentioned.

The rear element comprises a film base preferably of cellulose acetate bearing on its front side a red-sensitive, "green-blind", panchromatic emulsion, having spectral sensitivity ranges of 390 to 510 mu., and 580 to 690 mu., and having substantially no sensitivity in the spectral region between 510 to 580 mu. With an emulsion sensitized for these regions, and non-sensitive in the region specified, no red filter layer is needed before the panchromatic layer. In order to sensitize an emulsion for the regions specified, the emulsion may contain, for example, the unsymmetrical carbocyanine dye made from 2-methyl-alpha naphthiazole ethiodide and 4-6-dimethyl quinoline ethiodide, as disclosed by Piggott & Rodd, Application Serial No. 540,810, filed May 28, 1931, now U. S. Patent No. 2,071,898 granted February 23, 1937. Another example of a dye suitable for sensitizing emulsions for the region specified above is the unsymmetrical carbocyanine dye from 2-methyl-beta-naphthiazole ethiodide and 4-6-dimethyl quinoline ethiodide. The rear side of the base preferably bears a removable anti-halation coat of greenish hue, such as may be obtained by Victoria Green or Brilliant Green, applied so as to afford a total light transmission of approximately 25%. This anti-halation dye is removed by the baths used in ordinary processing of the film. The dyes above-described have the following general formulae:

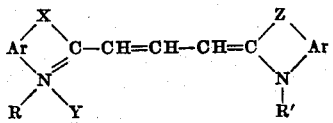

and

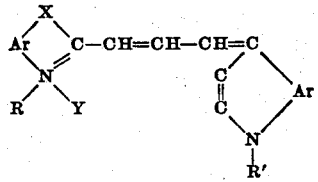

wherein X represents a radical taken from the group consisting of —O—, —S—, and dialkylmethylene, Z represents a bivalent radical different from X taken from the class consisting of —O—, —S—, dialkylmethylene and vinylene, R and R' represent alkyl radicals, Y represents the negative radical of an acid and Ar represents an arylene radical of the benzene series.

In the modified form of my invention, the panchromatic film may occupy the middle position of the tripack unit. Used this way, the middle film results in a sharper and more detailed blue-printing negative. Having no green sensitivity, no red filter is required in front of the panchromatic layer. In this modification, the base of the panchromatic film preferably is clear. In this arrangement, the green sensitive, or orthochromatic film occupies the rear position of the pack, with its emulsion surface facing the lens. The orthochromatic film preferably carries a removable red anti-halation dye on its rear side, such as is obtained by Acid Magenta.

While the foregoing are preferred embodiments of this invention, it is possible to accomplish similar results by modifying the invention in the following variations.

In a bi-pack arrangement, the front film is only blue-sensitive and contains a removable yellow filter dye such as Luxol Yellow. The back film carries an orthochromatic emulsion and coated on this directly, or on a clear separating layer on the orthochromatic coating, is a green-blind panchromatic emulsion. The surface of the panchromatic layer is in contact with the blue-sensitive emulsion of the front film.

In a bi-pack arrangement, the front film is the same as in the front just mentioned. The rear film carries the green-blind panchromatic layer next to the support and the orthochromatic emulsion is coated on a stripping layer on the panchromatic emulsion.

In a series of emulsion coatings on a single base, the green-blind panchromatic emulsion is coated first on the base. A separating layer, such as clear gelatin, is coated over the panchromatic layer and on this is coated the orthochromatic emulsion. Another clear separating layer is coated on the orthochromatic emulsion and on this is coated a blue sensitive emulsion containing a removable, yellow filter dye such as Luxol Yellow.

In a series of emulsion coatings on a single support, the green-blind panchromatic layer occupies the middle, the orthochromatic, the lower, and the blue-sensitive emulsion the upper or outer position with regard to the support, preferably with clear gelatin layers between the blue and the green and the green and the red.

In another series of emulsion coatings on a single support, the yellow-dyed, blue-sensitive emulsion is coated first on the support, then a clear separating layer, a layer of green-blind panchromatic emulsion, another clear separating layer and lastly, an orthochromatic layer. In this case, the film is exposed with the base towards the light source.

It is also possible to embody the invention in a tripack for use in the so-called Semi-Dialyte type of camera wherein a yellow filter is contained in the camera itself. In this case no yellow dye will be needed in the tripack unit.

The term "sensitivity range" as used in the specification and claims of this case is intended to define the total range to which each element is actually sensitive as shown in Fig. 1 at B, in Fig. 2 at B'+G, and in Fig. 3 at $B^2$+R. The term "spectral response" used herein is intended to define the range in which the element actually responds during exposure as shown in Fig. 1 at B, in Fig. 2 at G, and in Fig. 3 at R.

When the term "approximate" is used in the claims in connection with the phrase "spectral response" it is intended to define a plus or minus tolerance of 5 mu. on both limits of the ranges so modified.

The hereindescribed preferred embodiments are given in illustration and not in limitation of the invention which is intended to include all variations and modifications within the spirit and scope of the appended claims.

I claim:

1. In combination in a tripack, a front element comprising a film base containing a non-halation tint and bearing on its rear side a blue-sensitive emulsion layer containing a removable yellow filter dye, said emulsion having a sensitivity range of 390 to 520 mu; an intermediate element comprising a clear film base bearing on its front side a green sensitive emulsion having a sensitivity range of 390 to 580 mu; and a rear element comprising a film base containing a non-halation tint and bearing on its front side a red-sensitive emulsion containing 1'-dimethyl-3,3'-diethyl-benzo-thiazole-indolenine-carbocyanine iodide.

2. In combination in a tripack, a front element comprising a film base bearing on its rear side a blue-sensitive emulsion layer containing a removable yellow filter dye, said emulsion having a sensitivity range of 390 to 520 mu; and intermediate element comprising a clear film base bearing on its front side a green-sensitive emulsion having a sensitivity range of 390 to 580 mu; and a rear element comprising a film base bearing on its front side a red-sensitive emulsion containing 1'-dimethyl-3,3'-diethyl-benzothiazole-indolenine-carbocyanine iodide and a non-halation tint incorporated in the base of said front element.

3. In combination in a tripack, a front element comprising a film base containing a non-halation tint and bearing on its rear side a blue-sensitive emulsion layer containing a removable yellow filter dye, said emulsion having a sensitivity range of 390 to 520 mu; an intermediate element comprising a clear film base bearing on its front side a green sensitive emulsion having a sensitivity range of 390 to 580 mu; and a rear element comprising a film base containing a non-halation tint and bearing on its front side a red-sensitive emulsion containing 1'-dimethyl-1,3'-diethyl-2-quinolino-indolenine-carbocyanine iodide.

4. In combination in a tripack, a front element comprising a film base bearing on its rear side a blue-sensitive emulsion layer containing a removable yellow filter dye, said emulsion having a sensitivity range of 390 to 520 mu; an intermediate element comprising a clear film base bearing on its front side a green-sensitive emulsion having a sensitivity range of 390 to 580 mu; and a rear element comprising a film base bearing on its front side a red-sensitive emulsion containing 1'-dimethyl-1,3'-diethyl-2-quinolino-indolenine-carbocyanine iodide and a non-halation tint incorporated in the base of said front element.

5. In combination in a tripack, a front element comprising a film base containing a non-halation tint and bearing on its rear side a blue-sensitive emulsion layer containing a removable yellow filter dye, said emulsion having a sensitivity range of 390 to 520 mu; an intermediate element comprising a clear film base bearing on its front side a green sensitive emulsion having a sensitivity range of 390 to 580 mu; and a rear element comprising a film base containing a non-halation tint and bearing on its front side a red-sensitive emulsion containing a green-blind unsymmetrical dye taken from the class of compounds having one of the following two formulae:

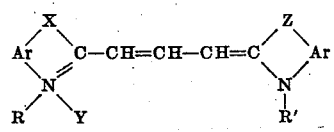

and

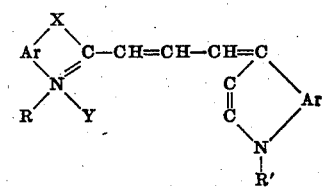

wherein X represents a radical taken from the group consisting of —O—, —S—, and dialkylmethylene, Z represents a bivalent radical different from X taken from the class consisting of —O—, —S—, dialkylmethylene and vinylene, R and R' represent alkyl radicals, Y represents the negative radical of an acid and Ar represents an arylene radical of the benzene series.

VIRGIL B. SEASE.